United States Patent
Acharya et al.

(10) Patent No.: US 6,677,051 B1
(45) Date of Patent: Jan. 13, 2004

(54) MAGNETIC RECORDING MEDIUM WITH DUAL MAGNETIC LAYERS HAVING SPECIFIC COMPOSITION REQUIREMENTS AND A MAGNETIC STORAGE APPARATUS

(75) Inventors: B. Ramamurthy Acharya, Kawasaki (JP); Iwao Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/648,097

(22) Filed: Aug. 25, 2000

(30) Foreign Application Priority Data

Dec. 10, 1999  (JP) .......................... 11-351986

(51) Int. Cl.[7] ............................. G11B 5/66
(52) U.S. Cl. .............. 428/611; 428/637; 428/668; 428/678; 428/332; 428/694 TS
(58) Field of Search ................ 428/611, 678, 428/332, 694 TS, 694 TM, 637, 668

(56) References Cited

U.S. PATENT DOCUMENTS

| | | | |
|---|---|---|---|
| 5,523,173 A | * 6/1996 | Doerner et al. | 428/611 |
| 5,693,426 A | 12/1997 | Lee et al. | 428/611 |
| 5,879,783 A | * 3/1999 | Chang et al. | 428/141 |
| 5,952,097 A | * 9/1999 | Zhang | 428/332 |
| 6,143,388 A | * 11/2000 | Bian et al. | 428/65.3 |
| 6,183,832 B1 | * 2/2001 | Margulies et al. | 428/65.3 |

FOREIGN PATENT DOCUMENTS

| JP | 7014142 | 1/1995 |
|---|---|---|
| JP | 10162336 | 6/1998 |

OTHER PUBLICATIONS

Derwent Abstract Translation of JP 05–290352 A (Derwent Acc. No. 1993–389569).*
Song, L, Gardner, R., McLaurin, S., Sedighi, M., IEEE Trans. Mag., 30(6), 1994, pp 4011–4013.*
Kanbe, T., Tamai, I., Takahashi, Y., Tanahashi, K., Hosoe, Y., Ishikawa, A., Kataoka, H., IEEE Trans. Mag., 33(5), 1997, pp 2980–2982.*

* cited by examiner

Primary Examiner—D. S. Nakarani
Assistant Examiner—Kevin M. Bernatz
(74) Attorney, Agent, or Firm—Greer, Burns & Crain, Ltd.

(57) ABSTRACT

A magnetic recording medium is constructed to include a substrate, and a magnetic layer disposed above the substrate, wherein the magnetic layer has an initial layer on a side closer to the substrate and a final layer on a side opposite from the substrate with respect to the initial layer. The initial layer is made of a CoCrB-based alloy having a thickness of 1 to 10 nm, and the final layer is made of a Co-based alloy having a thickness of 5 to 30 nm.

11 Claims, 12 Drawing Sheets

MAGNETIC RECORDING MEDIUM WITH DUAL MAGNETIC LAYERS HAVING SPECIFIC COMPOSITION REQUIREMENTS AND A MAGNETIC STORAGE APPARATUS

BACKGROUND OF THE INVENTION

This application claims the benefit of a Japanese Patent Application No. 11-351986 filed Dec. 10, 1999, in the Japanese Patent Office, the disclosure of which is hereby incorporated by reference.

1. Field of the Invention

The present invention generally relates to magnetic recording media and magnetic storage apparatuses, and more particularly to a magnetic recording medium and a magnetic storage apparatus for carrying out a high-density longitudinal magnetic recording.

2. Description of the Related Art

The storage capacity of longitudinal magnetic recording media has been rising rapidly due to reduction of media noise and the development of magneto-resistive and high-sensitivity spin-valve heads.

A typical magnetic recording medium includes a substrate, a seed layer, a Cr or Cr-based underlayer, a Co-based magnetic layer where the information is written, a C or Diamond-Like C (DLC) overlayer, and an organic lubricant layer which are successively stacked in this order.

Lowering the media noise involves decreasing the grain size and size distribution of the magnetic layer, by reducing the magnetic layer thickness. It is possible to reduce the magnetic layer thickness by the proper use of an underlayer made of CrMo or NiAl, for example, and by the use of an intermediate layer which is disposed between the underlayer and the magnetic layer and is made of CrTiB, for example. By lowering the media noise, it becomes possible to improve the signal-to-noise ratio (SNR) and to achieve high-density recording.

The underlayer also promotes crystallographic c-axis orientation of the magnetic layer in a plane which increases the remanent magnetization and the thermal stability of bits. In order to obtain a satisfactory crystallographic c-axis orientation of the magnetic layer, the underlayer thickness must be set relatively large, since a thin underlayer deteriorates the crystallographic c-axis orientation of the magnetic layer. However, the grain size distribution of the magnetic layer usually follows the grain size distribution of the underlayer, and the underlayer grain size has a dependence on the underlayer thickness such that the underlayer grain size increases as the underlayer thickness increases. In other words, in order to decrease the grain size and size distribution of the magnetic layer, it is necessary to reduce the underlayer thickness.

Therefore, the conventional magnetic recording medium had a problem in that the control of the underlayer thickness leads to a tradeoff between the crystallographic c-axis orientation of the magnetic layer and the grain size and size distribution of the magnetic layer. That is, the crystallographic c-axis orientation of the magnetic layer can be improved by increasing the underlayer thickness, but this results in increased grain size and size distribution of the magnetic layer. On the other hand, the grain size and size distribution of the magnetic layer can be improved by reducing the underlayer thickness, but this results in deteriorated crystallographic c-axis orientation of the magnetic layer.

SUMMARY OF THE INVENTION

Accordingly, it is a general object of the present invention to provide a novel and useful magnetic recording medium and magnetic storage apparatus, in which the problems described above are eliminated.

Another and more specific object of the present invention to provide a magnetic recording medium and a magnetic storage apparatus which can satisfactorily control both the crystallographic c-axis orientation and the grain size and size distribution of the magnetic layer, so that improved SNR and high-density recording are obtainable.

Still another object of the present invention is to provide a magnetic recording medium comprising a substrate, and a magnetic layer disposed above the substrate, wherein the magnetic layer has an initial layer on a side closer to the substrate, and a final layer on a side opposite from the substrate with respect to the initial layer, the initial layer is made of a CoCrB-based alloy having a thickness of 1 to 10 nm, and the final layer is made of a Co-based alloy having a thickness of 5 to 30 nm. According to the magnetic recording medium of the present invention, it is possible to make the grain size of the magnetic layer much smaller than the underlayer grain size. Hence, it is possible to realize a magnetic recording medium which can satisfactorily control both the crystallographic c-30 axis orientation and the grain size and size distribution of the magnetic layer, so that improved SNR and high-density recording are obtainable.

The magnetic recording medium may further comprise a non-magnetic underlayer disposed between the substrate and the initial layer, where the initial layer nucleates small grain size and uniform grain size distribution in the final layer, so that grain diameters of the final layer are smaller than those of the non-magnetic underlayer.

In the magnetic recording medium, the initial layer may be made of $CoCr_aB_bX_cY_d$, where X=Pt, Y=Ta, $30 \geq a$ (at %)$\geq 15$, $8 \geq b$ (at %)$\geq 1$, $15 \geq c$ (at %)$\geq 0$, and $5 \geq d$ (at %)$\geq 0$.

In the magnetic recording medium, the initial layer may be non-magnetic at room temperature.

In the magnetic recording medium, the final layer may be made of a material selected from a group of Co, Fe, Ni and alloys thereof, CoCrTa, CoCrPt, CoCrPtB, CoCrPtTa, CoCrPtW and CoCrPtTaNb.

A further object of the present invention is to provide a magnetic recording medium comprising a substrate, and a magnetic layer disposed above the substrate, where the magnetic layer has an initial layer on a side closer to the substrate, and a final layer on a side opposite to the substrate with respect to the initial layer, the initial layer is made of a CoCrB-based alloy having a B content of 1 at % or greater, and the second layer is made of a Co-based alloy having a B content which is 0 or smaller than the B content of the initial layer. According to the magnetic recording medium of the present invention, it is possible to satisfactorily control both the crystallographic c-axis orientation and the grain size and size distribution of the magnetic layer, so that improved SNR and high-density recording are obtainable.

Another object of the present invention is to provide a magnetic recording medium comprising a substrate, and a magnetic layer disposed above the substrate, where the magnetic layer has an initial layer on a side closer to the substrate, and a final layer on a side opposite to the substrate with respect to the initial layer, the initial layer is made of a CoCrX-based alloy, where X is an element or alloy which promotes Cr segregation, and the second layer is made of a Co-based alloy having a X content which is 0 or smaller than the X content of the initial layer. According to the magnetic recording medium of the present invention, it is possible to satisfactorily control both the crystallographic c-axis orientation and the grain size and size distribution of the magnetic layer, so that improved SNR and high-density recording are obtainable.

In this case, X may be selected from a group of B, Ag, Cu, C, P and alloys thereof.

Still another object of the present invention is to provide a magnetic storage apparatus comprising at least one magnetic recording medium, and at least one head which records information on and reproducing information from the magnetic recording medium, where the magnetic recording medium comprises a substrate, and a magnetic layer disposed above the substrate, the magnetic layer has an initial layer on a side closer to the substrate, and a final layer on a side opposite from the substrate with respect to the initial layer, the initial layer is made of a CoCrB-based alloy having a thickness of 1 to 10 nm, and the final layer is made of a Co-based alloy having a thickness of 5 to 30 nm. According to the magnetic storage apparatus of the present invention, it is possible to realize satisfactorily control both the crystallographic c-axis orientation and the grain size and size distribution of the magnetic layer, so that improved SNR and high-density recording are obtainable.

A further object of the present invention is to provide a magnetic storage apparatus comprising at least one magnetic recording medium, and at least one head which records information on and reproducing information from the magnetic recording medium, where the magnetic recording medium comprises a substrate and a magnetic layer disposed above the substrate, the magnetic layer has an initial layer on a side closer to the substrate, and a final layer on a side opposite to the substrate with respect to the initial layer, the initial layer is made of a CoCrB-based alloy having a B content of 1 at % or greater, and the second layer is made of a Co-based alloy having a B content which is 0 or smaller than the B content of the initial layer. According to the magnetic storage apparatus of the present invention, it is possible to satisfactorily control both the crystallographic c-axis orientation and the grain size and size distribution of the magnetic layer, so that improved SNR and high-density recording are obtainable.

Another object of the present invention is to provide a magnetic storage apparatus comprising at least one magnetic recording medium, and at least one head which records information on and reproducing information from the magnetic recording medium, where the magnetic recording medium comprises a substrate and a magnetic layer disposed above the substrate, the magnetic layer has an initial layer on a side closer to the substrate, and a final layer on a side opposite to the substrate with respect to the initial layer, the initial layer is made of a CoCrX-based alloy, where X is an element or alloy which promotes Cr segregation, and the second layer is made of a Co-based alloy having a X content which is 0 or smaller than the X content of the initial layer. According to the magnetic storage apparatus of the present invention, it is possible to satisfactorily control both the crystallographic c-axis orientation and the grain size and size distribution of the magnetic layer, so that improved SNR and high-density recording are obtainable.

Other objects and further features of the present invention will be apparent from the following detailed description when read in conjunction with the accompanying drawings.

DESCRIPTION OF THE PREFERRED EMBODIMENTS

A description will be given of embodiments of a magnetic recording medium according to the present invention and a magnetic storage apparatus according to the present invention, by referring to the accompanying drawings.

Figure 1:
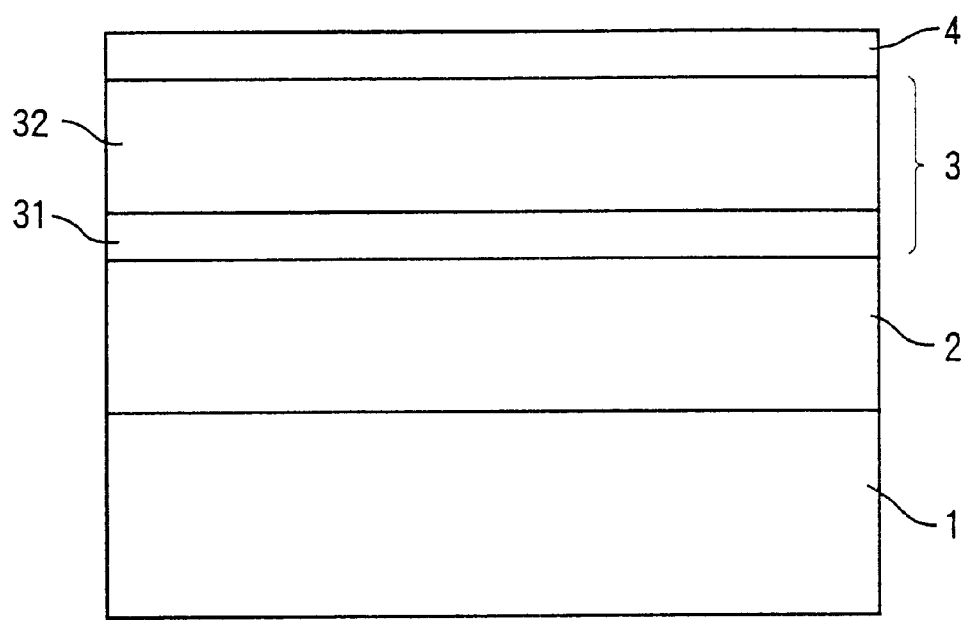
FIG. 1 is a cross sectional view showing an important part of a first embodiment of a magnetic recording medium according to the present invention.

FIG. 1 is a cross sectional view showing an important part of a first embodiment of the magnetic recording medium according to the present invention. The magnetic recording medium shown in FIG. 1 includes a substrate 1, a non-magnetic underlayer 2, a magnetic layer 3, and an overlayer 4.

The magnetic layer 3 is made up of an initial layer 31 and a final layer 32.

In this embodiment, the substrate 1 is made of glass, sapphire, silicon or Al. The surface of the substrate 1 may be mechanically textured to have anisotropy in one direction, if necessary. The surface of the glass, sapphire or silicon substrate 1 may be plated with NiAl. In addition, the surface of the Al substrate 1 may be sputtered with NiP.

The non-magnetic underlayer 2 may have any of the following first and second structures. According to the first structure, the non-magnetic underlayer 2 is made of a material selected from a group of Cr, CrMo, CrTi, CrV, CrW and CrMn, and has a thickness of 5 to 30 nm, and this first structure is suited for use with the substrate 1 which is made of Al. Further, according to the second structure, the non-magnetic underlayer 2 is made of NiAl or FeAl, and has a thickness of 5 to 60 nm, and this second structure is suited for use with the substrate 1 which is made of glass, sapphire or silicon.

The initial layer 31 is made of a CoCrB-based alloy having a thickness of 1 to 10 nm. The final layer 32 is made of a Co-based alloy having a thickness of 5 to 30 nm. The initial layer 31 has a B content of 1 at % or greater, and preferably in a range of 4 to 10 at %. On the other hand, the final layer 32 has a B content which is 0 or, smaller than the B content of the initial layer 31. For example, the final layer 32 has a B content of 0 to 6 at %, and preferably less than 4 at %. The initial layer 31 is used to nucleate small grain size and uniform grain size distribution in the final layer 32. As a result, the grain diameters of the final layer 32 are smaller than those of the non-magnetic underlayer 2.

The initial layer 31 may be made of $CoCr_aB_bX_cY_d$, where X=Pt, Y=Ta, $30 \geq a$ (at %)$\geq 15$, $8 \geq b$ (at %)$\geq 1$, $15 \geq c$ (at %)$\geq 0$, and $5 \geq d$ (at %)$\geq 0$. In addition, the initial layer 31 may be non-magnetic at room temperature, due to a high Cr concentration or, due to small grain volumes.

The final layer 32 may be made of a material selected from a group of Co, Fe, Ni and alloys thereof, CoCrTa, CoCrPt, CoCrPtB, CoCrPtTa, CoCrPtW and CoCrPtTaNb. In this case, the thickness of the final layer 32 may be 5 to 30 nm, with the crystallographic c-axis of the final layer 32 oriented substantially along the surface of the initial layer 31 on which the final layer 32 is provided.

The overlayer 4 is made of C or DLC. Preferably, the surface of the overlayer 4 is coated with an organic lubricant layer.

According to this first embodiment of the magnetic recording medium, it is possible to obtain a satisfactory crystallographic c-axis orientation of the initial layer 31 with respect to the underlayer 2. In addition, it is possible to obtain small grain size and small grain size distribution of the final layer 32. As a result, it is possible for the magnetic layer 3 as a whole to reduce the media noise, thereby enabling a high SNR and high recording density to be obtained by the magnetic recording medium.

In this embodiment, the initial layer 31 is made of an alloy including B. However, when an element or alloy which promotes Cr segregation is denoted by X, the initial layer 31 may be made of a CoCrX-based alloy in a modification of this embodiment. In this modification, the final layer 32 is made of a Co-based alloy having a X content which is 0 or smaller than the X content of the initial layer 31. In this modification, X is made of B, Ag, Cu, C, P or alloys thereof, for example.

Figure 2:
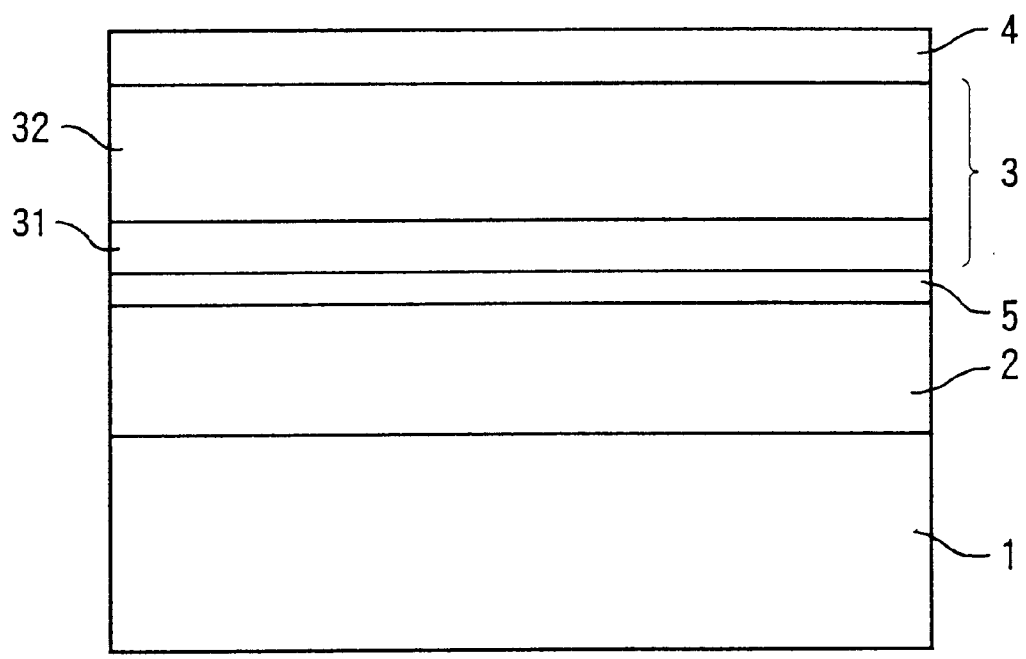
FIG. 2 is a cross sectional view showing an important part of a second embodiment of the magnetic recording medium according to the present invention.

Next, a description will be given of a second embodiment of the magnetic recording medium according to the present invention. FIG. 2 is a cross sectional view showing an important part of this second embodiment of the magnetic recording medium. In FIG. 2, those parts which are the same as those corresponding parts in FIG. 1 are designated by the same reference numerals, and a description thereof will be omitted.

The magnetic recording medium shown in FIG. 2 additionally includes an intermediate layer 5 disposed between the underlayer 2 and the initial layer 31 of the magnetic layer 3. This intermediate layer 5 is made of a CoCr-based alloy, and has a thickness of 1 to 5 nm.

According to this second embodiment of the magnetic recording medium, the crystallographic c-axis orientation of the initial layer 31 is further improved by the provision of the intermediate layer 5.

Figure 3:
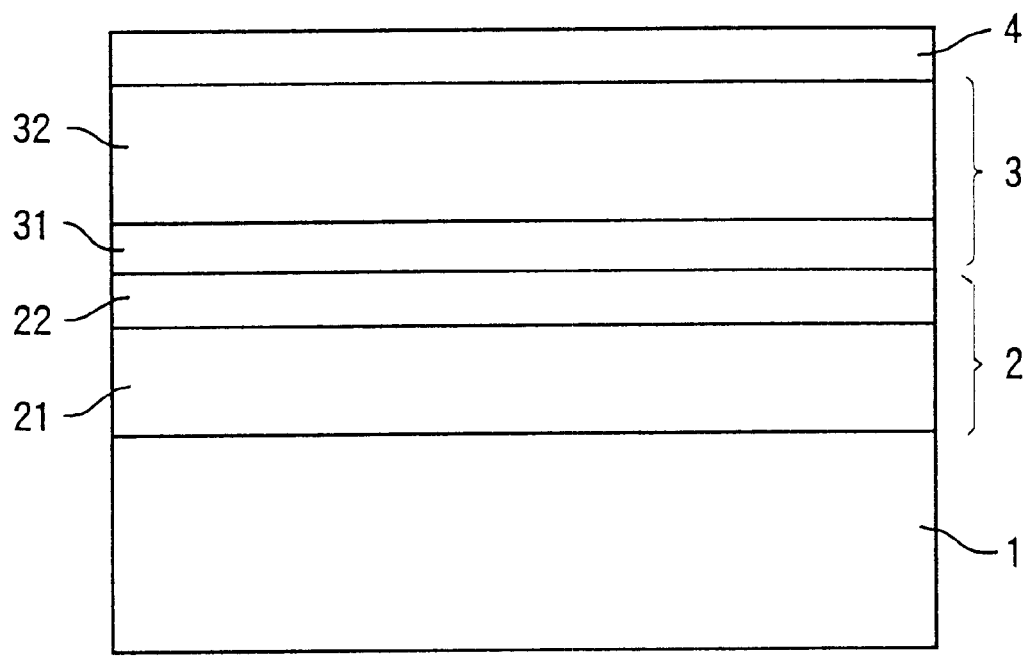
FIG. 3 is a cross sectional view showing an important part of a third embodiment of the magnetic recording medium according to the present invention.

Next, a description will be given of a third embodiment of the magnetic recording medium according to the present invention. FIG. 3 is a cross sectional view showing an important part of this third embodiment of the magnetic recording medium. In FIG. 3, those parts which are the same as those corresponding parts in FIG. 1 are designated by the same reference numerals, and a description thereof will be omitted.

In the magnetic recording medium shown in FIG. 3, the underlayer 2 has a bi-layer structure made up of a first underlayer portion 21 and a second underlayer portion 22. The first underlayer portion 21 is made of NiAl or an alloy having a B2 structure made up of or, a Cr or Cr-alloy. In addition, the second underlayer portion 22 is made of Cr or a Cr-based alloy, and has a thickness of 0.15 to 10 nm.

According to this third embodiment of the magnetic recording medium, it is possible to further improve the crystallographic c-axis orientation of the underlayer 2 as a whole regardless of the material used for the substrate 1, by employing the bi-layer structure for the underlayer 2.

Figure 4:
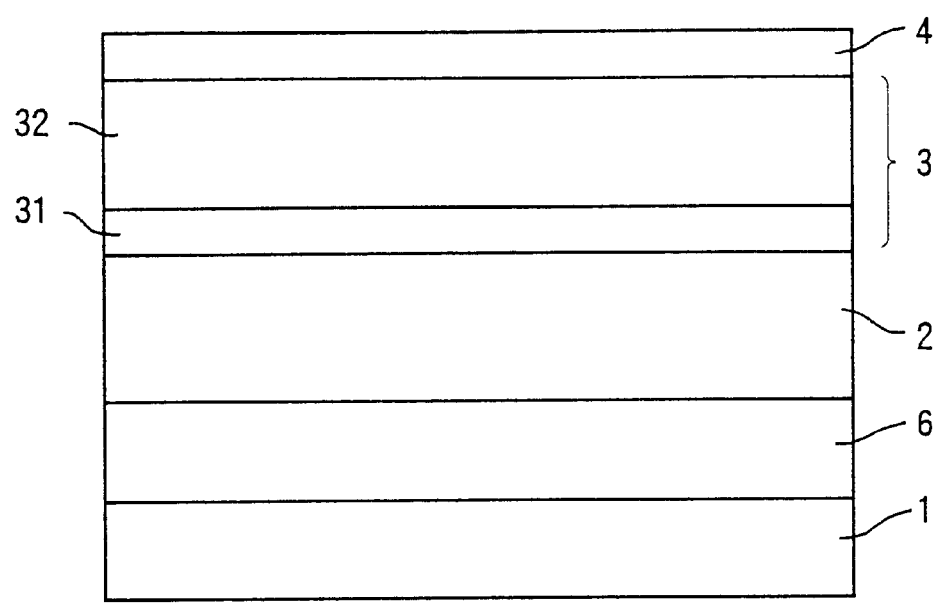
FIG. 4 is a cross sectional view showing an important part of a fourth embodiment of the magnetic recording medium according to the present invention.

Next, a description will be given of a fourth embodiment of the magnetic recording medium according to the present invention. FIG. 4 is a cross sectional view showing an important part of this fourth embodiment of the magnetic recording medium. In FIG. 4, those parts which are the same as those corresponding parts in FIG. 1 are designated by the same reference numerals, and a description thereof will be omitted.

The magnetic recording medium shown in FIG. 4 additionally includes a seed layer 6 which is made of NiP.

According to this fourth embodiment of the magnetic recording medium, it is possible to further improve the crystallographic c-axis orientation of the underlayer 2, particularly in the case where the substrate 1 is made of Al.

Of course, it is possible to appropriately combine the structures of two or more of the embodiments and modification described above.

Next, a description will be given of the grain structure obtainable by the magnetic recording medium according to the present invention.

Figure 5:
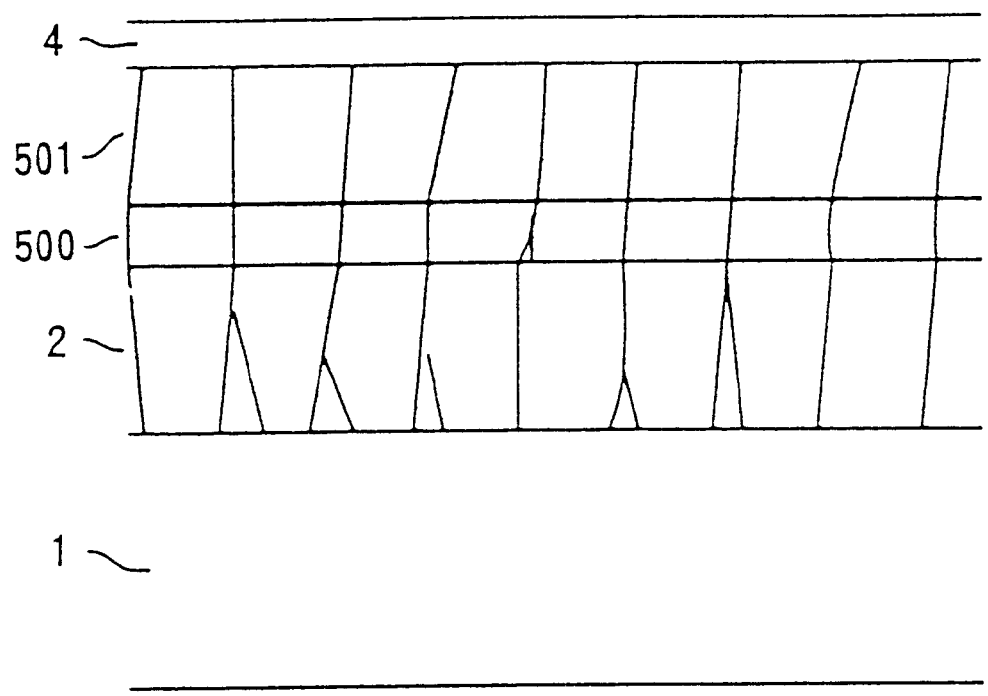
FIG. 5 is a cross sectional view showing the grain structure in a part of a magnetic recording medium having a magnetic layer with a single-layer structure.

For comparison purposes, FIG. 5 shows the grain structure in a part of a magnetic recording medium having a magnetic layer with a single-layer structure. This magnetic recording medium shown in FIG. 5 includes a substrate 1, an underlayer 2, an intermediate layer 500, a magnetic layer 501, and an overlayer 4. A combination of the intermediate layer 500 and the magnetic layer 501 should not be confused with the magnetic layer structure of the present invention, because the effects of this combination are completely different from the effects of the magnetic layer structure of the present invention. As shown in FIG. 5, the grain diameters of the underlayer 2, the intermediate layer 500 and the magnetic layer 501 are substantially the same.

Figure 6:
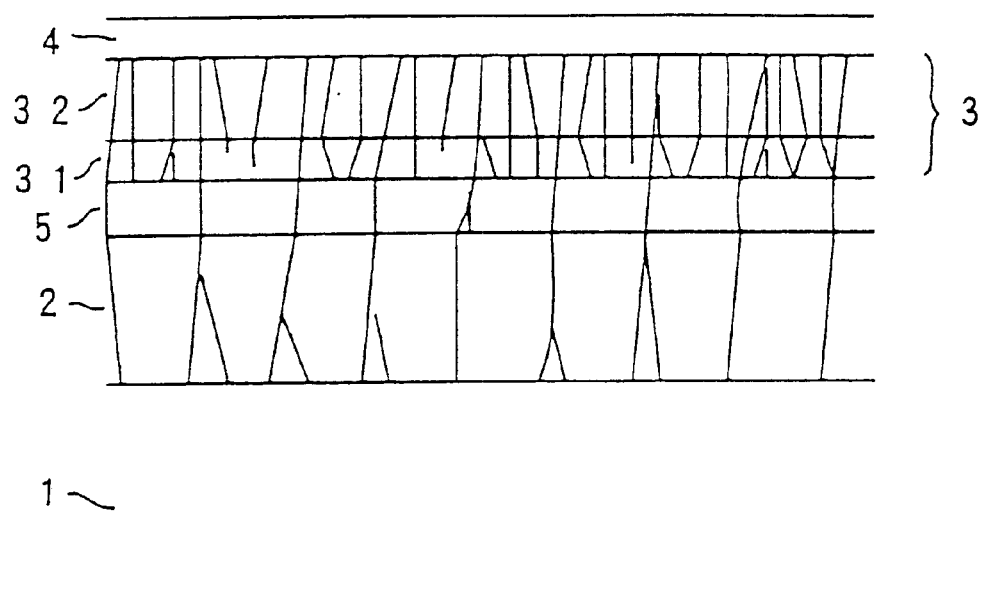
FIG. 6 is a cross sectional view showing the grain structure in a part of the second embodiment of the magnetic recording medium.

On the other hand, FIG. 6 shows the grain structure in a part of the second embodiment of the magnetic recording medium described above in conjunction with FIG. 2. In FIG. 6, those parts which are the same as those corresponding parts in FIG. 2 are designated by the same reference numerals, and a description thereof will be omitted. As shown in FIG. 6, the grain diameters of the underlayer 2, the intermediate layer 5 and a portion of the initial layer 31 are substantially the same. However, the grain diameters of the final layer 32 are considerably smaller than those of the underlayer 2.

Figure 7:
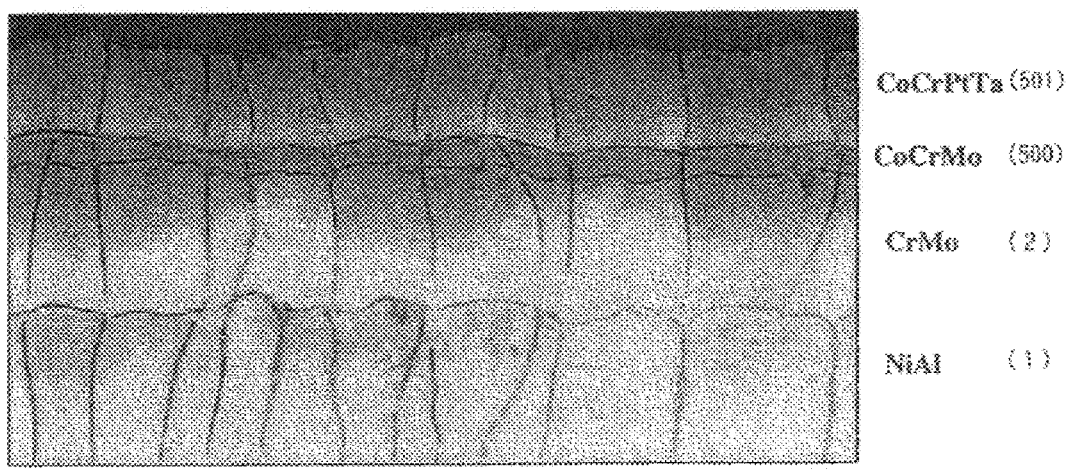
FIG. 7 is a cross sectional dark field TEM image taken of the magnetic recording medium shown in FIG. 5.

FIG. 7 is a cross sectional dark field Transmission Electron Microscopic (TEM) image taken of the magnetic recording medium shown in FIG. 5 for a case where the materials used for the substrate 1 (or substrate surface), the underlayer 2, the intermediate layer 500, the magnetic layer 501 and the overlayer 4 respectively are NiAl/CrMo/CoCrMo/CoCrPtTa/C.

It was confirmed from the TEM image shown in FIG. 7 that the grain diameters of the magnetic layer 501 are similar to those of the underlayer 2 for the magnetic recording medium shown in FIG. 5. As shown in FIG. 7, a columnar grain in the NiAl substrate 1 induces similar grain diameters on the subsequent layers 2, 500 and 501. This phenomenon is closely connected with the grains of the underlayer 2 which induce a particular crystallographic c-axis orientation of the subsequent layers 500 and 501.

Figure 8:
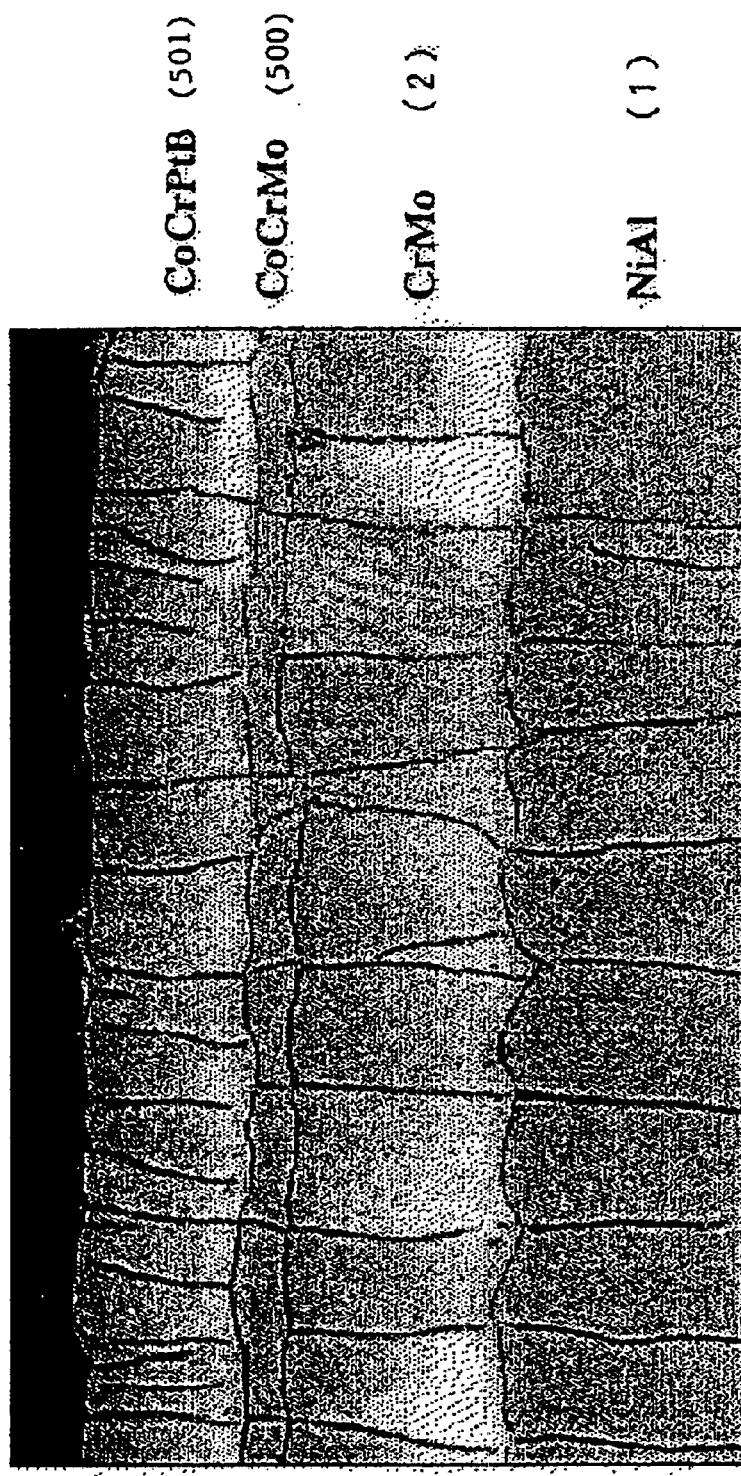
FIG. 8 is a cross sectional dark field TEM image taken of the magnetic recording medium shown in FIG. 5.

On the other hand, FIG. 8 is a cross sectional dark field TEM image taken of the magnetic recording medium shown in FIG. 5 for a case similar to that for FIG. 7 but CoCrPtb is used in place of CoCrPtTa for the magnetic layer 501. In addition, FIG. 9 is a plan dark field TEM image taken of the magnetic recording medium shown in FIG. 5 for a case where the magnetic layer 501 is made of CoCrPtB.

Figure 9:
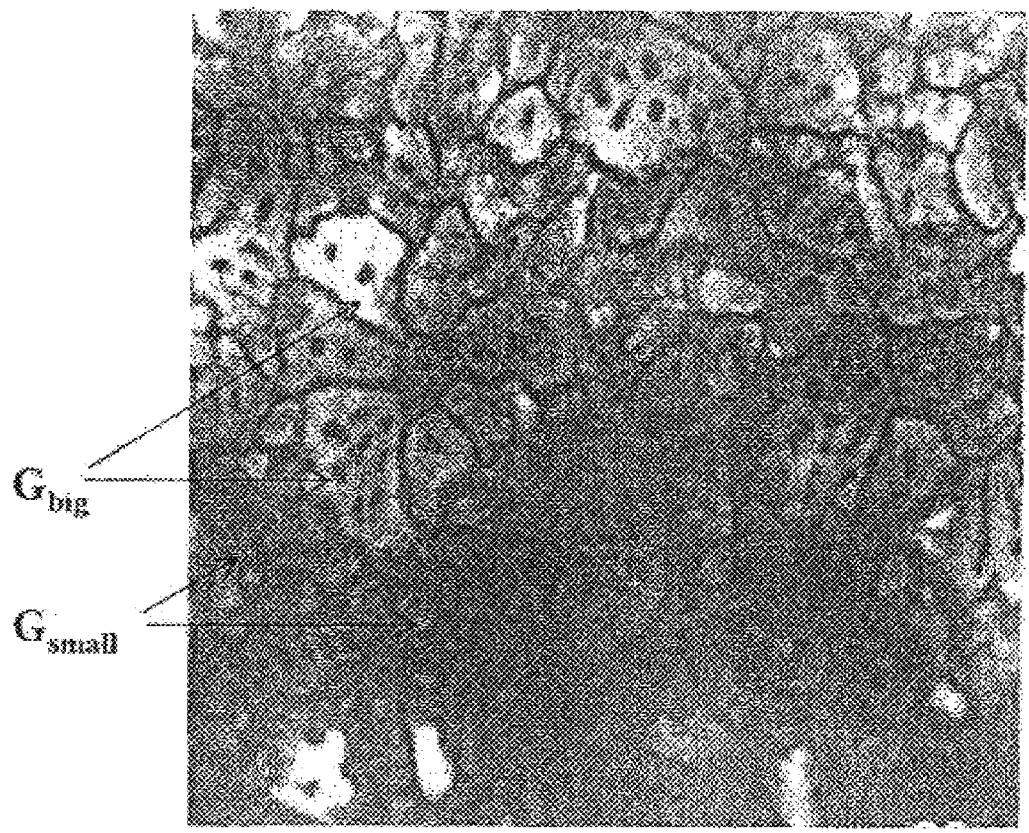
FIG. 9 is a plan dark field TEM image taken of an initial layer of the third embodiment of the magnetic recording medium.

It was confirmed from FIGS. 8 and 9 that the addition of B to the CoCr-based alloy of the magnetic layer 501 decreases the grain diameter, and that such grain diameters are much smaller than the grain diameters of the underlayer 2. In other words, several smaller CoCrPtB initial layer grains are formed on the CrMo underlayer grains. With the addition of B to the CoCr-based alloy of the initial layer 31, in addition to Cr segregation to the grain boundaries, additional Cr rich spots are created within a grain, as may be seen from FIG. 9. These Cr rich spots elongate to break a grain into smaller grains Gsmall. However, such a breaking of the grain is not complete in several grains, leaving Cr rich spots within a bigger grain Gbig. Therefore, a CoCr-based alloy grain of the initial layer 31 formed over an CrMo underlayer grain either splits into several smaller grains Gsmall or remains as a bigger grain Gbig with some Cr rich spots within. As a result, a relatively large grain size distribution exists in the initial layer 31.

But in the third embodiment of the magnetic recording medium, the CoCrB-based alloy is not used as a recording layer, but as an initial layer 31 in order to nucleate small grain size and uniform grain size distribution in the Co-based alloy final layer 32 of the magnetic layer 3. The Cr rich spots in the bigger grain Gbig of the CoCrB-based alloy will act as nucleation sites for the final layer 32, such that smaller grains Gsmall of the Co-based alloy are obtained even on such bigger grains Gbig of the CoCrB-based alloy.

Figure 10A:
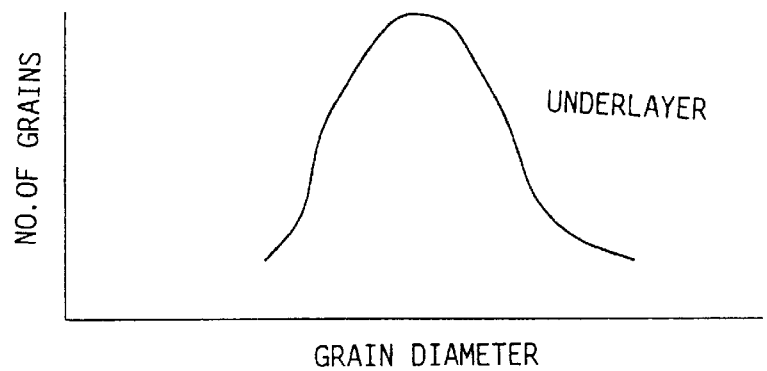
FIGS. 10A, 10B and 10C are diagrams showing the grain size distributions of an underlayer, the initial layer and a final layer of the third embodiment of the magnetic recording medium.
Figure 10B:
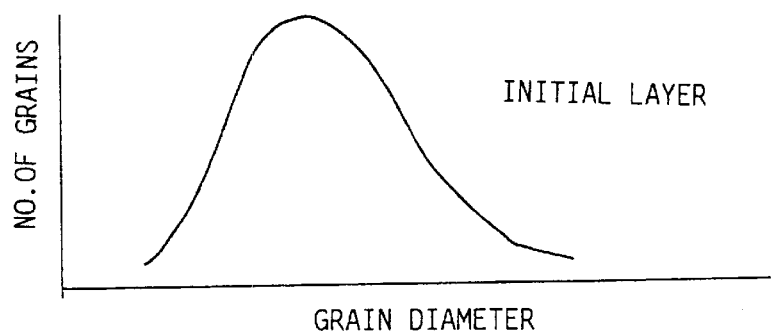
Figure 10C:
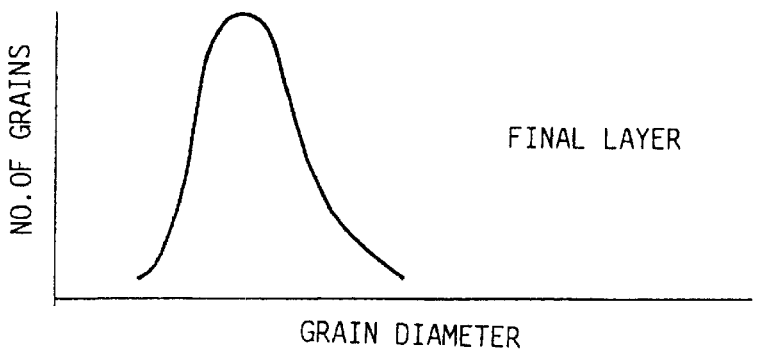

Therefore, small grain sizes with uniform distribution are formed in the CoCr-based alloy final layer 32 which is formed on the CoCrB-based alloy initial layer 31, as shown in FIGS. 10A, 10B and 10C. FIGS. 10A, 10B and 10C are diagrams showing the grain size distributions of the underlayer 2, the initial layer 31 and the final layer 32 of the third embodiment of the magnetic recording medium. In FIGS. 10A, 10B and 10C, the ordinate indicates the number of grains in arbitrary units, and the abscissa indicates the grain diameter in arbitrary units. FIG. 10A shows the grain size distribution of the underlayer 2, FIG. 10B shows the grain size distribution of the initial layer 31, and FIG. 10C shows the grain size distribution of the final layer 32.

Figure 11:
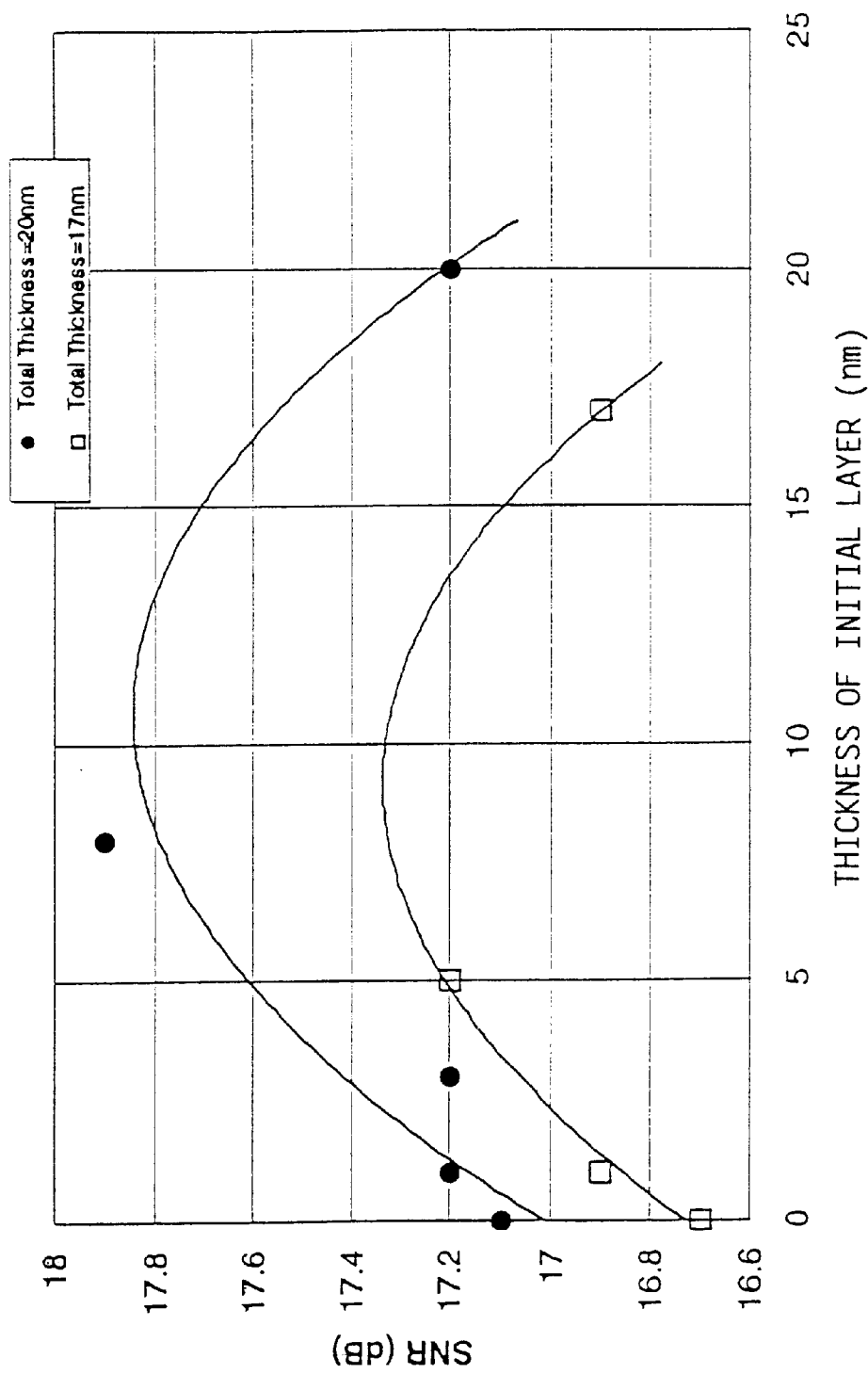
FIG. 11 is a diagram showing the SNR of a combination of the second and fourth embodiments of the magnetic recording medium.

FIG. 11 is a diagram showing the SNR of a combination of the second and fourth embodiments of the magnetic recording medium for various thicknesses of the initial layer 31. In FIG. 11, the ordinate indicates the SNR in dB, the abscissa indicates the thickness of the initial layer 31 in nm, black circular marks "●" indicate the SNR for a total thickness of the magnetic layer 3 of 20 nm, and rectangular marks "□" indicate the SNR for a total thickness of the magnetic layer 3 of 17 nm. The SNR shown in FIG. 11 was obtained for a case where the materials used for the first underlayer portion 21, the second underlayer portion 22, the intermediate layer 5, the initial layer 31, and the final layer 32 respectively are Al/NiP/CrMo$_{10}$/CoCr$_{35}$/CoCr$_{24}$Pt$_{10}$B$_6$/CoCr$_{22}$Pt$_{12}$Ta$_2$. It may be seen from FIG. 11 that a higher SNR can be obtained by the magnetic layer 3 having the bi-layer structure made up of the initial layer 31 and the final layer 32, as compared to a case where only the initial layer 31 or only the final layer 32 is provided as the magnetic layer 3.

Figure 12:
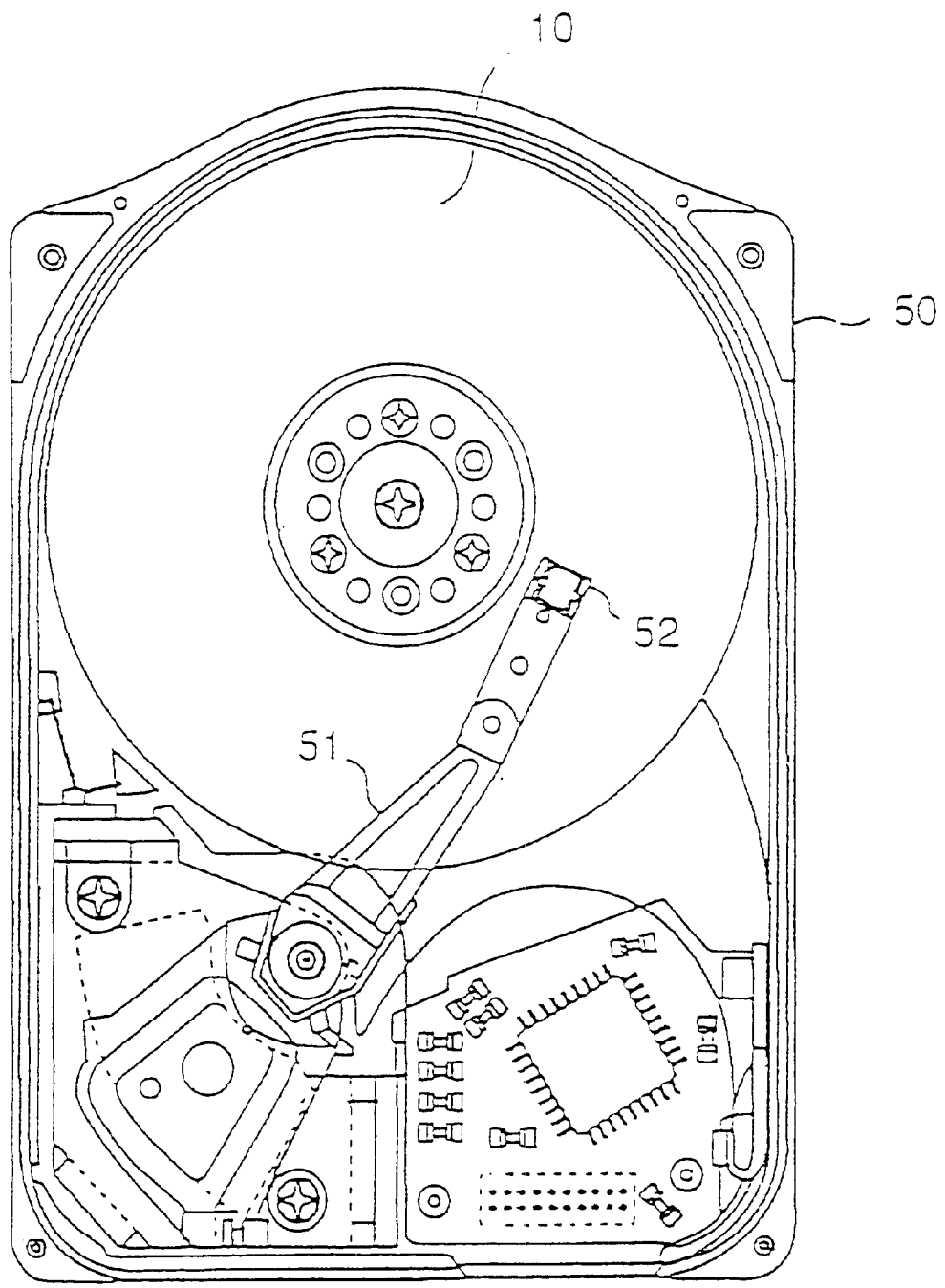
FIG. 12 is a plan view showing an important part of an embodiment of a magnetic storage apparatus according to the present invention.

FIG. 12 is a plan view showing an important part of an embodiment of a magnetic storage apparatus according to the present invention. The magnetic storage apparatus shown in FIG. 12 generally includes a housing 50, a plurality of arms 51, a recording and reproducing head 52 provided at the tip end of each arm 51, and a plurality of magnetic recording media 10. FIG. 12 shows a state where a lid (not shown) which seals the upper portion of the housing 50 is removed. The recording and reproducing head 52 has a known construction including a reproducing head portion such as a magneto-resistive (MR) head or a giant MR (GMR) head, and a recording head portion such as an inductive head. A detailed description of the basic construction of the magnetic storage apparatus shown in FIG. 12 will be omitted since the basic construction itself is known. This embodiment of the magnetic storage apparatus is characterized by the structure of the magnetic recording media 10. The magnetic recording media 10 may have the structure of any one of the embodiments of the magnetic recording medium described above.

The basic construction of the magnetic storage apparatus to which the magnetic recording medium according to the present invention may be applied, is of course not limited to that shown in FIG. 12, and the magnetic recording medium according to the present invention is similarly applicable to various magnetic storage apparatuses having other constructions. In addition, it is sufficient for the magnetic storage apparatus to include at least one magnetic recording medium.

Further, the present invention is not limited to these embodiments, but various variations and modifications may be made without departing from the scope of the present invention.

What is claimed is:

1. A magnetic recording medium comprising:

a substrate;

a magnetic layer disposed above said substrate, said magnetic layer having an initial layer on a first one of two sides closer to said substrate, and a final layer on a second one of the two sides directly on said initial layer and opposite to said substrate with respect to the initial layer, said initial layer being made of a CoCrB-based alloy having a B content of 1 at % or greater, said final layer being made of a Co-based alloy having a B content which is 0 or smaller than the B content of the initial layer; and a non-magnetic underlayer disposed between said substrate and said initial layer, wherein said final layer has small grain size and uniform grain size distribution nucleated by said initial layer, so that an average grain diameter of said final layer is smaller than an average grain diameter of said non-magnetic underlayer, and wherein said initial layer is non-magnetic at room temperature.

2. The magnetic recording medium as claimed in claim 1, wherein said initial layer is made up of magnetically exchange decoupled grains having an average grain diameter smaller than said average grain diameter of said non-magnetic underlayer.

3. A magnetic recording medium comprising:

a substrate;

a magnetic layer disposed above said substrate, said magnetic layer having an initial layer on a first one of two sides closer to said substrate, and a final layer on a second one of the two sides directly on said initial layer and opposite to said substrate with respect to the initial layer, said initial layer being made of a CoCrX-based alloy, where X is selected from a group consisting of B, Ag, Cu, C, P and alloys thereof, said final layer being made of a Co-based alloy having an X content which is 0 or smaller than the X content of the initial layer; and a non-magnetic underlayer disposed between said substrate and said initial layer, wherein said final layer has small grain size and uniform grain size distribution nucleated by said initial layer, so that an average grain diameter of said final layer is smaller than an average grain diameter of said non-magnetic underlayer, and wherein said initial layer is non-magnetic at room temperature.

4. The magnetic recording medium as claimed in claim 3, wherein said initial layer is made up of magnetically exchange decoupled grains having an average grain diameter smaller than said average grain diameter of said non-magnetic underlayer.

5. A magnetic storage apparatus comprising:

at least one magnetic recording medium; and at least one head which records information on and reproducing information from said magnetic recording medium, said magnetic recording medium comprising:

a substrate;

a magnetic layer disposed above said substrate, said magnetic layer having an initial layer on a first one of two sides closer to said substrate, and a final layer on a second one of the two sides directly on said initial layer and opposite to said substrate with respect to the initial layer, said initial layer being made of a CoCrB-based alloy having a B content of 1 at % or greater, said final layer being made of a Co-based alloy having a B content which is 0 or smaller than the B content of the initial layer; and a non-magnetic underlayer disposed between said substrate and said initial layer, wherein said final layer has small grain size and uniform grain size distribution nucleated by said initial layer, so that an average grain diameter of said final layer is smaller than an average grain diameter of said non-magnetic underlayer, and wherein said initial layer is non-magnetic at room temperature.

6. A magnetic storage apparatus comprising:

at least one magnetic recording medium; and at least one head which records information on and reproducing information from said magnetic recording medium, said magnetic recording medium comprising:

a substrate;

a magnetic layer disposed above said substrate, said magnetic layer having an initial layer on a first one of two sides closer to said substrate, and a final layer on a second one of the two sides directly on said initial layer and opposite to said substrate with respect to the initial layer, said initial layer being made of a CoCrX-based alloy, where X is selected from a group consisting of B, Ag, Cu, C, P and alloys thereof, said final layer being made of a Co-based alloy having a X content which is 0 or smaller than the X content of the initial layer; and a non-magnetic underlayer disposed between said substrate and said initial layer, wherein said final layer has small grain size and uniform grain size distribution nucleated by said initial layer, so that an average grain diameter of said final layer is smaller than an average grain diameter of said non-magnetic underlayer, and wherein said initial layer is non-magnetic at room temperature.

7. A magnetic recording medium comprising:

a substrate;

a magnetic layer disposed above said substrate, said magnetic layer having an initial layer on a first one of two sides closer to said substrate, and a final layer on a second one of the two sides directly on said initial layer and opposite to said substrate with respect to the initial layer, said initial layer being made of a CoCrB-based alloy having a B content of 1 at % or greater, said final layer being made of a Co-based alloy having a B content which is 0 or smaller than the B content of the initial layer; and a non-magnetic underlayer disposed between said substrate and said initial layer, wherein said final layer is made up of magnetically decoupled grains, said magnetically decoupled grains having an average grain diameter smaller than an average grain diameter of grains in a final layer disposed directly on a non-magnetic underlayer with no initial layer disposed therebetween, and wherein said initial layer is non-magnetic at room temperature.

8. The magnetic recording medium as claimed in claim 7, wherein said initial layer is made of $CoCr_aB_bX_cY_d$, where X=Pt, Y=Ta, $30 \geq a$ (at %)$\geq 15$, $8 \geq b$ (at %)$\geq 1$, $15 \geq c$ (at %)$\geq 0$, and $5 > d$ (at %)$> 0$.

9. The magnetic recording medium as claimed in claim 7, wherein the final layer is made of a material selected from a group consisting of Co, Fe, Ni, CoCrTa, CoCrPt, CoCrPtB, CoCrPtTa, CoCrPtW, CoCrPtTaNb, and alloys thereof.

10. The magnetic recording medium as claimed in claim 7, wherein said initial layer has a thickness of 1 to 10 nm, and said final layer has a thickness of 5 to 30 nm.

11. The magnetic recording medium as claimed in claim 7, wherein said initial layer is made up of magnetically exchange decoupled grains having an average grain diameter smaller than said average grain diameter of said non-magnetic underlayer.

* * * * *